(12) United States Patent
Sasaki et al.

(10) Patent No.: US 12,544,041 B2
(45) Date of Patent: Feb. 10, 2026

(54) ULTRASOUND DIAGNOSIS APPARATUS, MEASUREMENT CONDITION SETTING METHOD, AND NON-TRANSITORY COMPUTER-READABLE STORAGE MEDIUM

(71) Applicant: CANON KABUSHIKI KAISHA, Tokyo (JP)

(72) Inventors: Shoya Sasaki, Kanagawa (JP); Yoshinori Hirano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 17/470,583

(22) Filed: Sep. 9, 2021

(65) Prior Publication Data

US 2022/0079553 A1    Mar. 17, 2022

(30) Foreign Application Priority Data

Sep. 14, 2020    (JP) ................ 2020-153486

(51) Int. Cl.
| | |
|---|---|
| *A61B 8/00* | (2006.01) |
| *A61B 8/08* | (2006.01) |
| *G06N 3/08* | (2023.01) |
| *G06T 7/00* | (2017.01) |
| *G16H 30/20* | (2018.01) |
| *G16H 50/20* | (2018.01) |

(52) U.S. Cl.
CPC ............. *A61B 8/5223* (2013.01); *G06N 3/08* (2013.01); *G06T 7/0012* (2013.01); *G16H 30/20* (2018.01); *G16H 50/20* (2018.01); *A61B 8/0866* (2013.01); *A61B 8/0891* (2013.01); *A61B 8/465* (2013.01); *A61B 8/469* (2013.01); *G06T 2207/10132* (2013.01); *G06T 2207/20084* (2013.01)

(58) Field of Classification Search
CPC ...... A61B 8/5223; G06N 3/08; G06T 7/0012; G16H 30/20; G16H 50/20
See application file for complete search history.

(56) References Cited

U.S. PATENT DOCUMENTS

2009/0275834 A1\* 11/2009 Watanabe ............... A61B 8/463
600/443
2014/0303499 A1\* 10/2014 Toma ...................... G16H 50/30
600/454

(Continued)

FOREIGN PATENT DOCUMENTS

| EP | 3127486 A1 | 2/2017 |
|---|---|---|
| EP | 3127486 A4 | 1/2018 |

(Continued)

*Primary Examiner* — Amal Aly Farag
(74) *Attorney, Agent, or Firm* — Canon U.S.A., Inc., IP Division

(57) ABSTRACT

A generation unit that generates ultrasound image data on a subject, an inference unit that infers at least one measurement condition candidate for the ultrasound image data on the subject using a trained model trained with measurement conditions set for ultrasound image data as supervised data, a measurement condition setting unit that sets a measurement condition for the ultrasound image data on the subject using the at least one inferred measurement condition candidate, and a measurement unit that makes a measurement on the ultrasound image data on the subject based on the set measurement condition.

12 Claims, 10 Drawing Sheets

(56) References Cited

U.S. PATENT DOCUMENTS

| | | | | |
|---|---|---|---|---|
| 2020/0107818 A1* | 4/2020 | Keshet | ................. | A61B 8/0883 |
| 2020/0265754 A1* | 8/2020 | Buras | ................... | A61B 8/5292 |
| 2021/0089812 A1* | 3/2021 | Li | ............................ | G06N 3/08 |

FOREIGN PATENT DOCUMENTS

| | | | |
|---|---|---|---|
| JP | 2018187087 | A | 11/2018 |
| JP | 2019024925 | A | 2/2019 |
| JP | 2019039050 | A1 | 9/2020 |

* cited by examiner

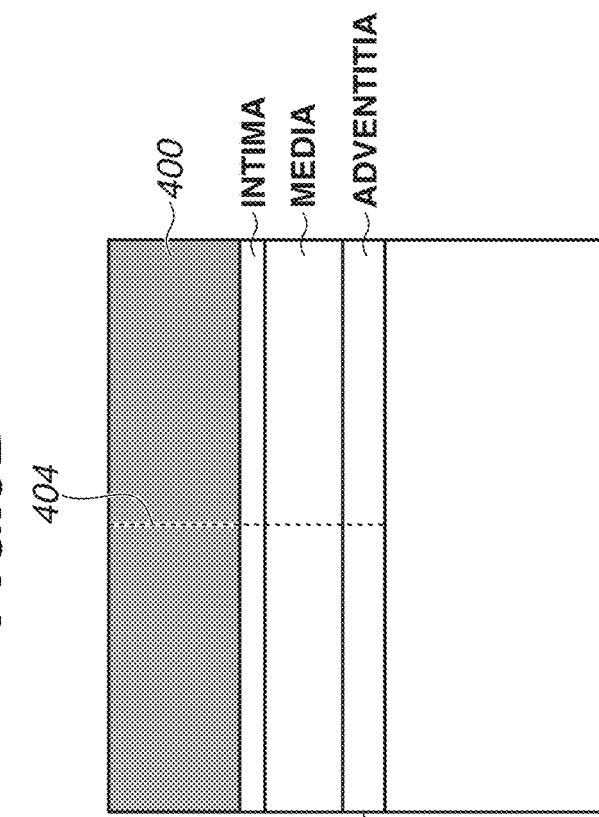
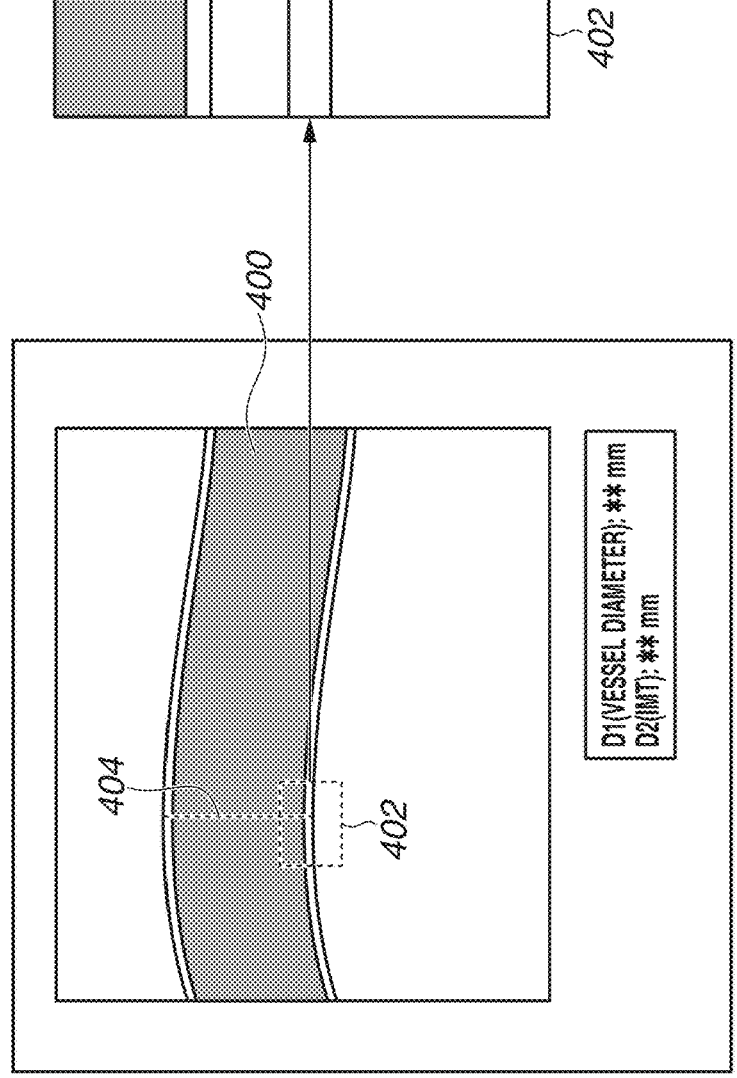

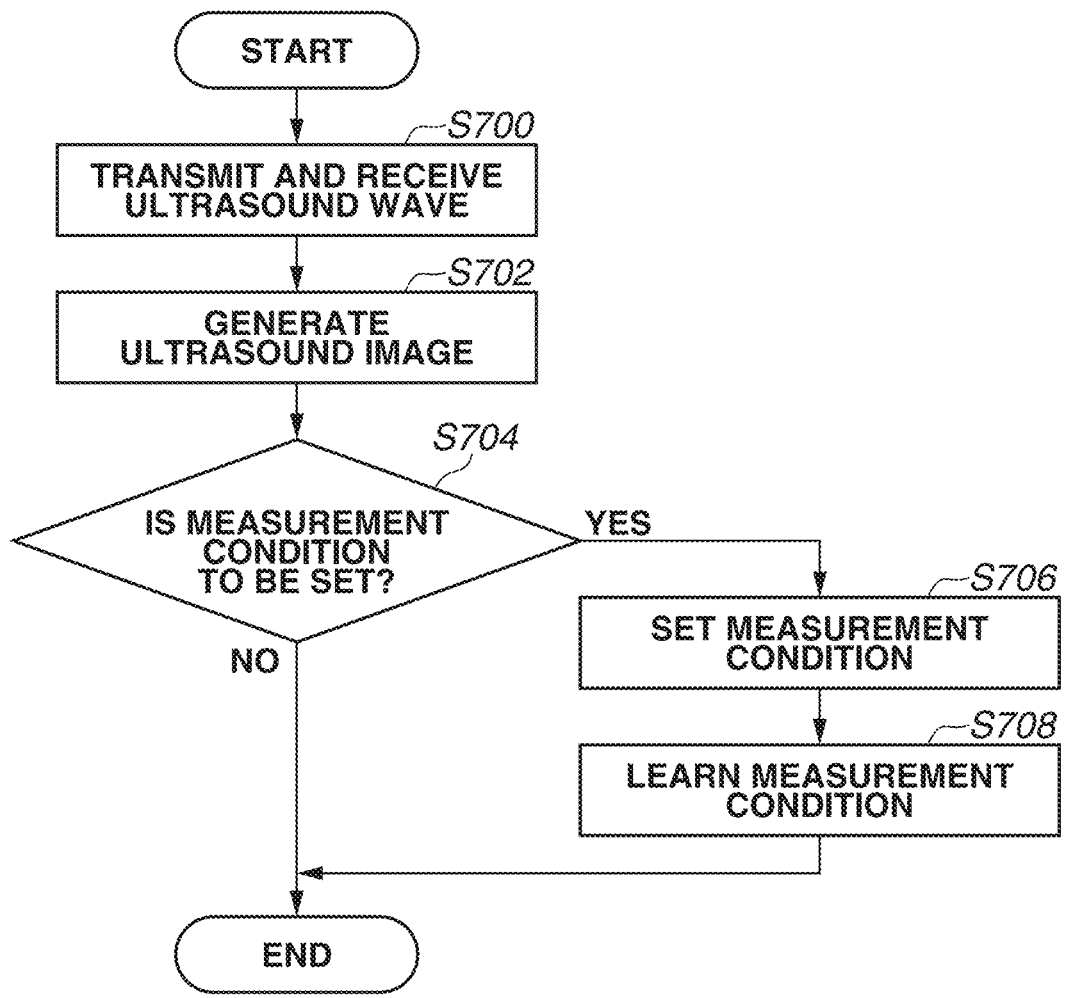

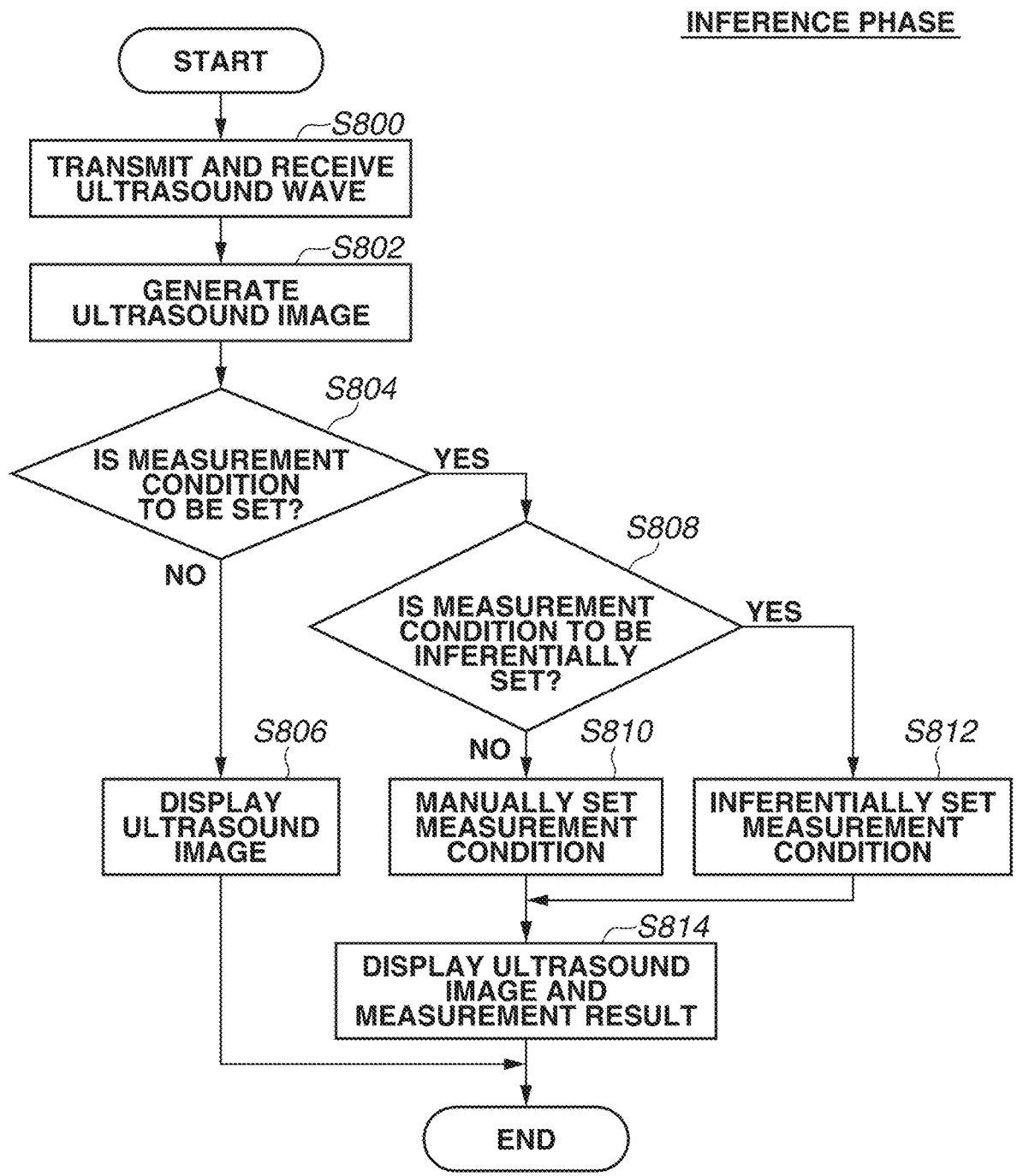

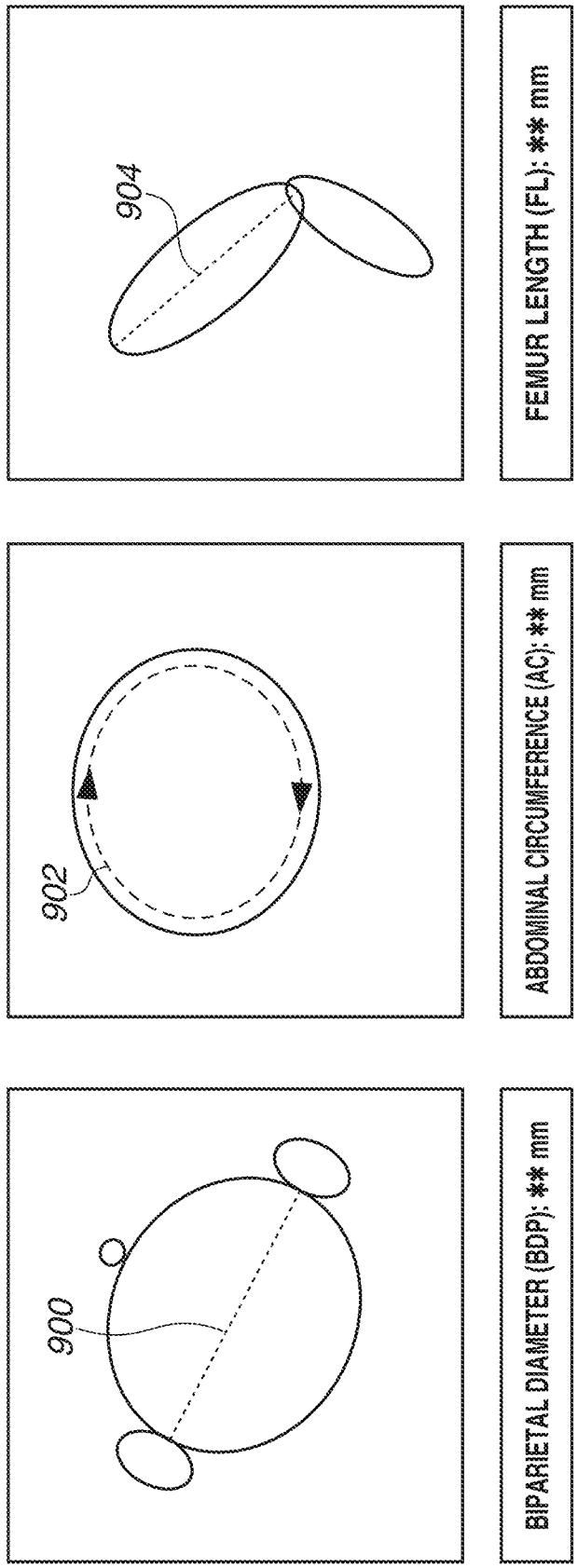

ULTRASOUND DIAGNOSIS APPARATUS, MEASUREMENT CONDITION SETTING METHOD, AND NON-TRANSITORY COMPUTER-READABLE STORAGE MEDIUM

BACKGROUND

Field of the Disclosure

The present disclosure relates to an ultrasound diagnosis apparatus that makes various measurements on ultrasound image data, a measurement condition setting method, and a non-transitory computer-readable storage medium.

Description of the Related Art

Ultrasound image data captured by ultrasound diagnosis apparatuses may undergo measurements such as the distance between two points and the area and the volume of a region.

Japanese Patent Application Laid-Open No. 2018-187087 discusses a method of searching for the start time phase and the end time phase of a Doppler waveform and making a measurement based on the Doppler waveform. In addition, Japanese Patent Application Laid-Open No. 2018-187087 discusses that the search involves using learned data stored in a learned data storage unit.

Japanese Patent Application Laid-Open No. 2018-187087 discusses a method of specifying the time phases of a Doppler waveform using learned data, and making measurements based on the Doppler waveform, but does not discuss a method of setting measurement conditions using learned data, and making various measurements.

SUMMARY

The present disclosure is directed to providing an ultrasound diagnosis apparatus that sets a measurement condition for ultrasound image data on a subject and quickly makes various measurements (a distance, a circumference, an area, and a volume).

According to an aspect of the present invention, an ultrasound diagnosis apparatus includes a generation unit configured to generate ultrasound image data on a subject, an inference unit configured to infer at least one measurement condition candidate for the ultrasound image data on the subject using a trained model trained with measurement conditions set for ultrasound image data as supervised data, a measurement condition setting unit configured to set a measurement condition for the ultrasound image data on the subject using the at least one inferred measurement condition candidate, and a measurement unit configured to make a measurement on the ultrasound image data on the subject based on the set measurement condition.

Further features of the present disclosure will become apparent from the following description of exemplary embodiments with reference to the attached drawings.

BRIEF DESCRIPTION OF THE DRAWINGS

FIGS. 5A and 5B are diagrams illustrating an example of ultrasound image data output to a learning device according to the present invention.

FIG. 8 is a diagram illustrating an operation in the learning phase in the ultrasound diagnosis apparatus according to the present invention.

FIG. 9 is a diagram illustrating an operation in the inference phase in the ultrasound diagnosis apparatus according to the present invention.

FIGS. 10A to 10C are diagrams illustrating a second exemplary embodiment of the present invention.

DESCRIPTION OF THE EMBODIMENTS

With reference to the attached drawings, some exemplary embodiments of the present invention will be described below.

Figure 1:
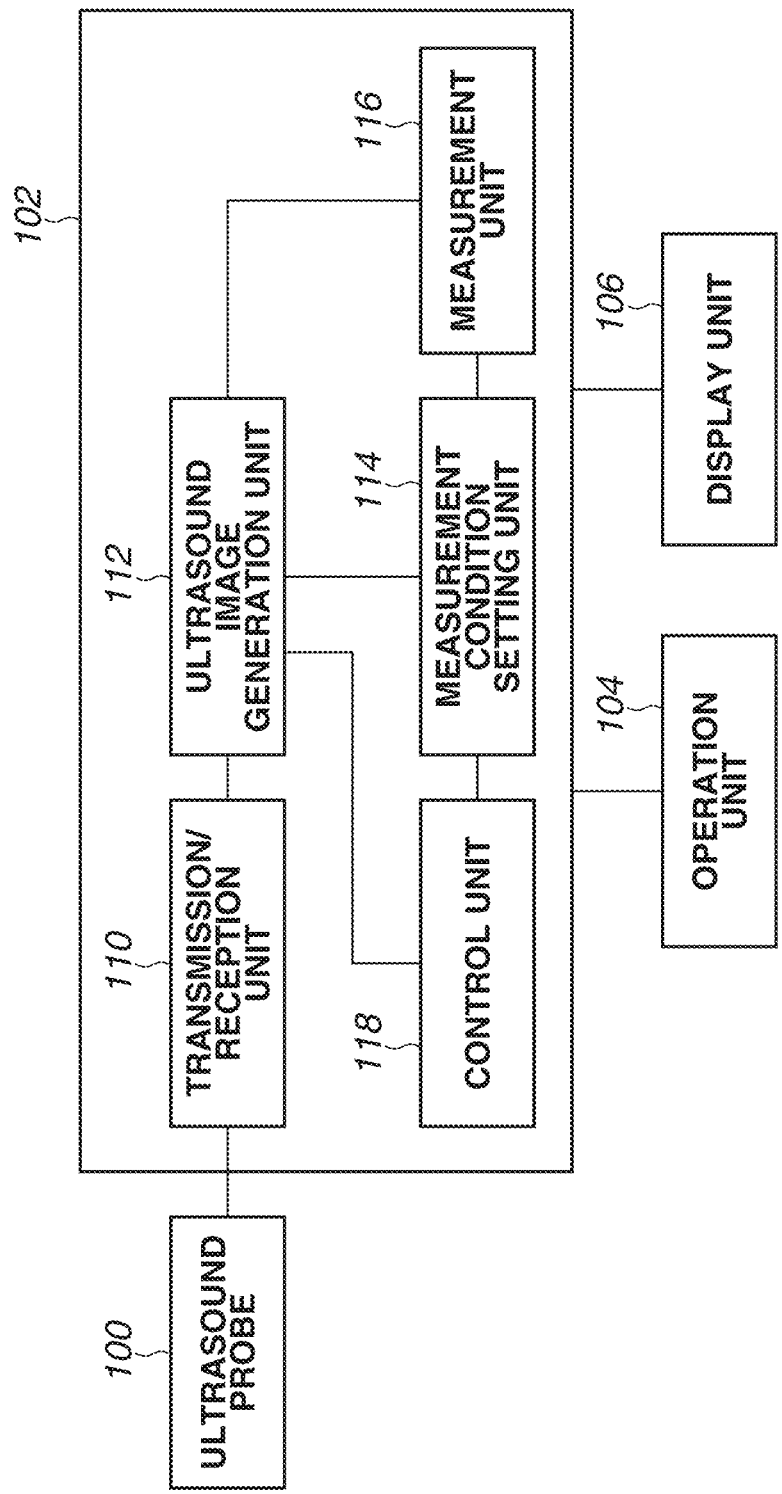
FIG. 1 is a diagram illustrating a configuration of an ultrasound diagnosis apparatus according to a first exemplary embodiment of the present invention.

FIG. 1 illustrates a configuration of an ultrasound diagnosis apparatus according to a first exemplary embodiment of the present invention. The ultrasound diagnosis apparatus includes an ultrasound probe 100, which is brought into contact with a subject and transmits and receives ultrasound waves, an apparatus main body 102, which generates ultrasound image data by processing ultrasound signals received by the ultrasound probe 100 and makes various measurements, an operation unit 104 for operating the apparatus main body 102, and a display unit 106, which displays the ultrasound image data and the measurement results.

The ultrasound probe 100 is connected to the apparatus main body 102. The ultrasound probe 100 includes plural vibrators and generates an ultrasound wave by driving the vibrators. The ultrasound probe 100 receives a reflected wave from the subject and converts the reflected wave into an electric signal.

The converted electric signal is transmitted to the apparatus main body 102.

The ultrasound probe 100 includes an acoustic matching layer and a backing material. The acoustic matching layer is at the front surfaces (facing a subject) of the vibrators and matches the acoustic impedances of the vibrators and the subject. The backing material is at the back surfaces of the vibrators and prevents the propagation of the ultrasound wave from the vibrators backward.

The ultrasound probe 100 is detachably connected to the apparatus main body 102. Examples of types of the ultrasound probe 100 include a linear type, a sector type, a convex type, a radial type, and a three-dimensional scanning type. An operator can select the type of the ultrasound probe 100 suitable for the use of imaging.

The apparatus main body 102 includes a transmission/reception unit 110, an ultrasound image generation unit 112, a measurement condition setting unit 114, a measurement unit 116, and a control unit 118. The transmission/reception unit 110 causes the ultrasound probe 100 to transmit and receive ultrasound waves. The ultrasound image generation unit 112 generates ultrasound image data using ultrasound signals received by the transmission/reception unit 110. The measurement condition setting unit 114 sets measurement conditions for making various measurements. The measurement unit 116 makes various measurements on the ultrasound image data with measurement conditions set by the measurement condition setting unit 114. The control unit 118 controls various components of the apparatus main body 102.

The transmission/reception unit 110 controls the transmission and reception of ultrasound waves performed by the ultrasound probe 100. The transmission/reception unit 110 includes a pulse generation unit and a transmission delay circuit and supplies driving signals to the ultrasound probe 100. The pulse generation unit repeatedly generates rate pulses at a predetermined pulse repetition frequency (PRF). The transmission delay circuit gives delay time for focusing an ultrasound wave generated by the ultrasound probe 100 and determining a transmission directionality to the rate pulses generated by the pulse generation unit.

The transmission delay circuit changes the delay time to be given to the rate pulses to control the transmission direction of an ultrasound wave to be transmitted from each vibrator.

The transmission/reception unit 110 also includes an amplifier, an analog-to-digital (A/D) conversion unit, a reception delay circuit, and an addition unit. The transmission/reception unit 110 performs various types of processing on a reflected wave signal received by the ultrasound probe 100 to generate an ultrasound signal. The amplifier amplifies the reflected wave signal on each channel and performs gain correction processing on the reflected wave signal. The A/D conversion unit performs A/D conversion on the reflected wave signal subjected to the gain correction. The reception delay circuit gives delay time for determining a reception directionality to this digital data. The addition unit performs addition processing on the reflected wave signal with the delay time given by the reception delay circuit. The addition processing of the addition unit enhances a reflection component from the direction corresponding to the reception directionality of the reflected wave signal.

To two-dimensionally scan the subject, the transmission/reception unit 110 causes the ultrasound probe 100 to transmit a two-dimensional ultrasound wave. Then, the transmission/reception unit 110 generates a two-dimensional ultrasound signal from the two-dimensional reflected wave signal received by the ultrasound probe 100. To three-dimensionally scan the subject, the transmission/reception unit 110 causes the ultrasound probe 100 to transmit a three-dimensional ultrasound wave. Then, the transmission/reception unit 110 generates a three-dimensional ultrasound signal from the three-dimensional reflected wave signal received by the ultrasound probe 100.

The ultrasound image generation unit 112 performs various types of signal processing on an ultrasound signal output from the transmission/reception unit 110, generating ultrasound image data. The ultrasound image generation unit 112 performs signal processing such as wave detection processing and logarithmic compression on the ultrasound signal, generating ultrasound image data (B-mode image data) of which the signal intensity is represented by the luminance brightness.

The ultrasound image generation unit 112 can generate bloodstream image data using a color Doppler method termed a color flow mapping (CFM) method. In the color Doppler method, an ultrasound wave is transmitted multiple times in the same direction, and the frequency of received reflected wave signals is analyzed based on the Doppler effect, extracting motion information about a bloodstream. Using the color Doppler method, the ultrasound image generation unit 112 generates bloodstream information such as the average speed, the dispersion, and the power as bloodstream image data. In one or more embodiments, the ultrasound image generation unit 112 generates bloodstream image data using a power Doppler method.

The measurement condition setting unit 114 sets measurement conditions for making various measurements. At least one of a measurement part of the subject, a measurement item in the measurement part of the subject, or a measurement range in the measurement part of the subject is a measurement condition. Based on the characteristics of the ultrasound image data, measurement conditions for making various measurements are set.

With measurement conditions set by the measurement condition setting unit 114, the measurement unit 116 makes various measurements using ultrasound image data. Various measurements include the distance between two points in a measurement part, the circumference, the area, and the volume of a measurement part.

The operation unit 104 includes a mouse, a keyboard, a button, a panel switch, a touch command screen, a foot switch, a trackball, and a joystick. The operation unit 104 receives various instructions from an operator of the ultrasound diagnosis apparatus and transmits the received instructions to the apparatus main body 102.

The display unit 106 displays a graphical user interface (GUI) for an operator of the ultrasound diagnosis apparatus to input various instructions using the operation unit 104 and displays ultrasound image data, bloodstream image data, and measurement results generated in the apparatus main body 102.

With a measurement condition set by the measurement condition setting unit 114, the display unit 106 displays the measurement condition and a measurement result on ultrasound image data generated by the ultrasound image generation unit 112.

In one or more embodiments, the transmission/reception unit 110, the ultrasound image generation unit 112, the measurement condition setting unit 114, the measurement unit 116, and the control unit 118 in the apparatus main body 102 are configured by hardware such as integrated circuitry or are programs modularized by software.

On a typical ultrasound diagnosis apparatus, an operator manually sets measurement conditions through the operation unit 104 while checking particular regions in ultrasound image data. The ultrasound diagnosis apparatus according to the present invention allows a measurement condition for newly generated ultrasound image data to be set using a trained model trained with measurement conditions set for ultrasound image data as supervised data. Examples of a trained model include a trained neural network and any other models such as a deep learning model and a support-vector machine. The trained model may be stored in the measurement condition setting unit 114 or in an information processing apparatus connected to the ultrasound diagnosis apparatus via a network.

Specifically, the control unit 118 learns measurement conditions set for ultrasound image data by the measurement condition setting unit 114 as supervised data, generating a trained model. Using the trained model, the control unit 118 identifies a cross section of newly generated ultrasound image data, inferring measurement condition candidates. The control unit 118 transmits the measurement condition candidates inferred by the control unit 118 to the measurement condition setting unit 114, and the measurement condition setting unit 114 sets a measurement condition. The measurement condition set by the measurement condition setting unit 114 is used for the newly generated ultrasound image data. With the measurement condition set by the measurement condition setting unit 114, the measurement unit 116 makes various measurements on the ultrasound image data.

Ultrasound image data to be input to the measurement condition setting unit 114 may be two-dimensional image data or three-dimensional image data (volume data).

As described above, a trained model is trained to infer measurement conditions. The trained model may be a model that identifies a cross section in two-dimensional image data to set a measurement condition, or a model that identifies plural cross sections in three-dimensional image data to set a measurement condition.

Figure 2:
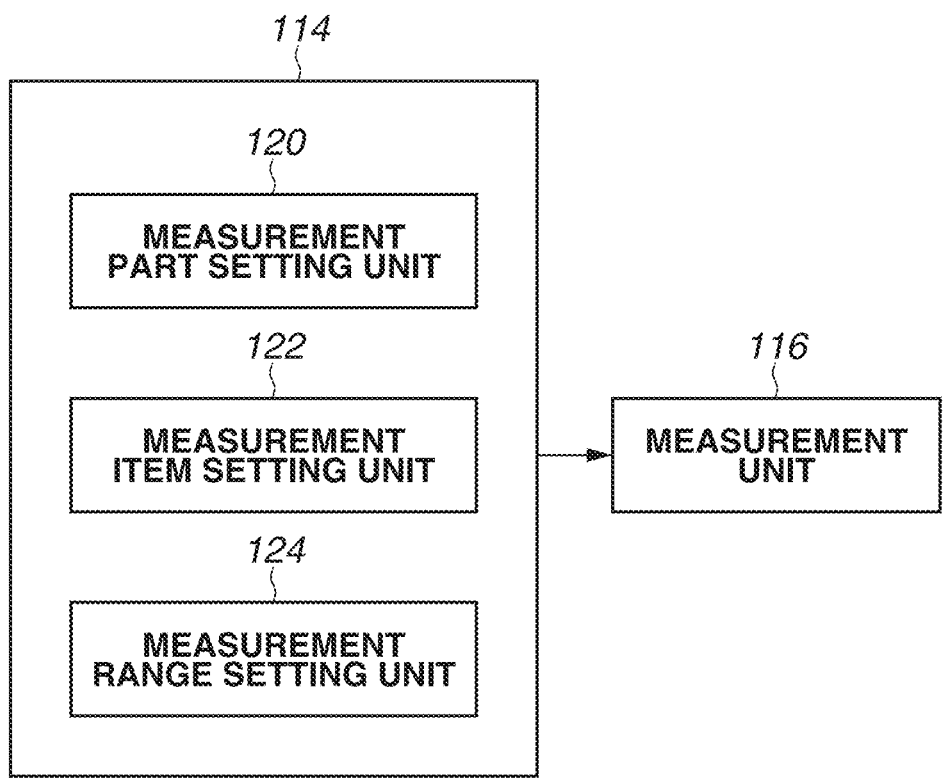
FIG. 2 is a diagram illustrating a configuration of a measurement condition setting unit of the ultrasound diagnosis apparatus according to the present invention.

FIG. 2 is a diagram illustrating a configuration of the measurement condition setting unit 114. The measurement condition setting unit 114 includes a measurement part setting unit 120, a measurement item setting unit 122, and a measurement range setting unit 124.

The measurement part setting unit 120 sets a measurement part in ultrasound image data generated by the ultrasound image generation unit 112. Examples of measurement parts include the abdomen, the chest, the heart, a carotid artery, and a fetus. The measurement part setting unit 120 can also identify a measurement part in the ultrasound image data generated by the ultrasound image generation unit 112 and set the measurement part.

The measurement item setting unit 122 sets the measurement items corresponding to the measurement part. For example, if the measurement part is a carotid artery, the measurement item setting unit 122 sets the items for measuring the vessel diameter and the intima-media thickness (IMT). The measurement item setting unit 122 can also set a gate for making a bloodstream measurement (a Doppler measurement).

The measurement range setting unit 124 sets measurement ranges (a cursor: a straight line or a curve) corresponding to the measurement items set by the measurement item setting unit 122 in the ultrasound image data.

A measurement range is a measurement caliper for measuring dimensions of tissue visualized in the ultrasound image data. A measurement caliper is used to specify a measurement range to measure a measurement target. For example, a measurement caliper is placed to sandwich a blood vessel displayed in the ultrasound image data, allowing diameters of the blood vessel to be measured.

A measurement caliper typically moves on a screen following the motion of a trackball of the operation unit 104. The operator places the measurement caliper in a measurement range in the measurement part. Then, the operator performs a confirmation operation to acquire the size (e.g., the distance, the circumference, or the area) of the measurement range.

Figure 3:
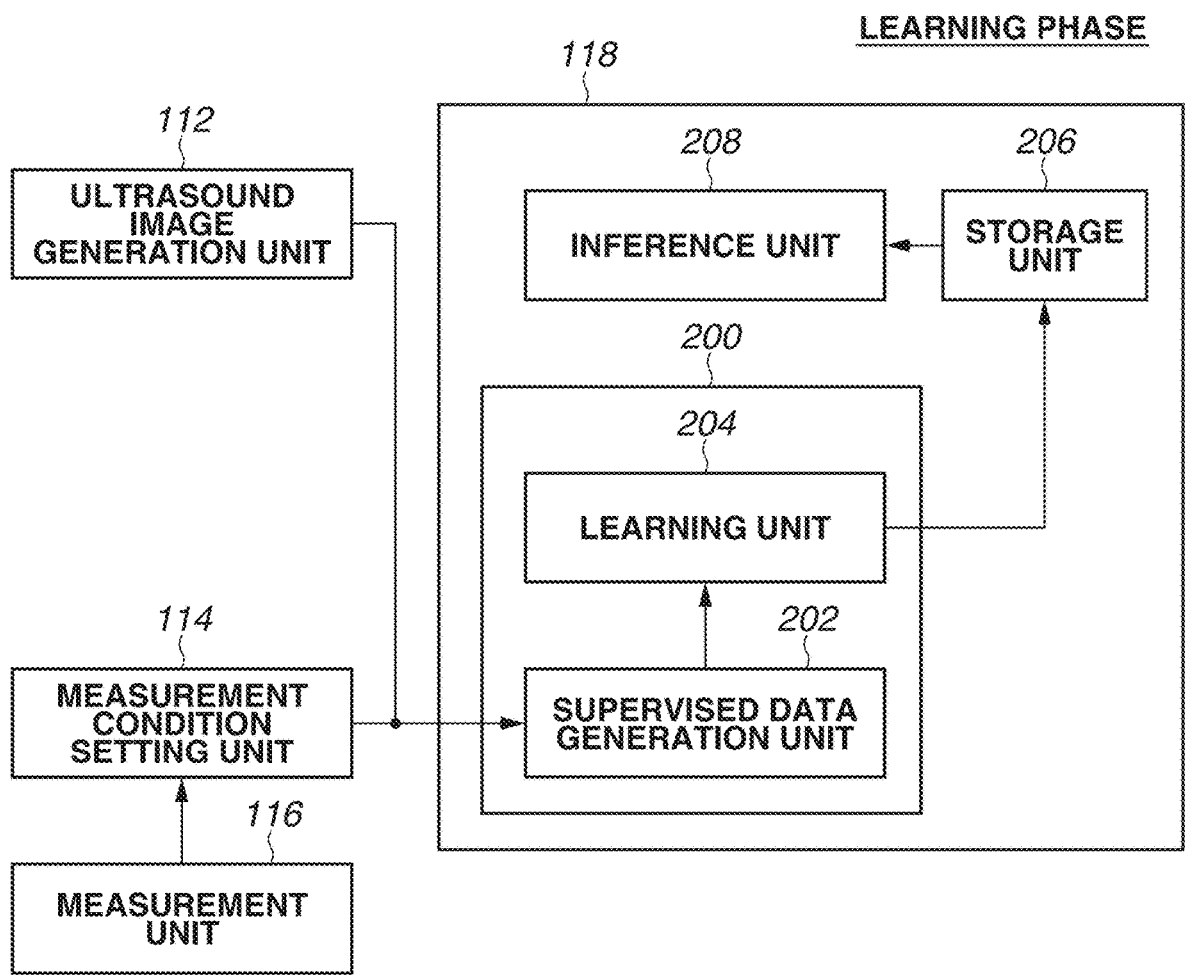
FIG. 3 is a diagram illustrating a learning phase of the ultrasound diagnosis apparatus according to the present invention.
Figure 4:
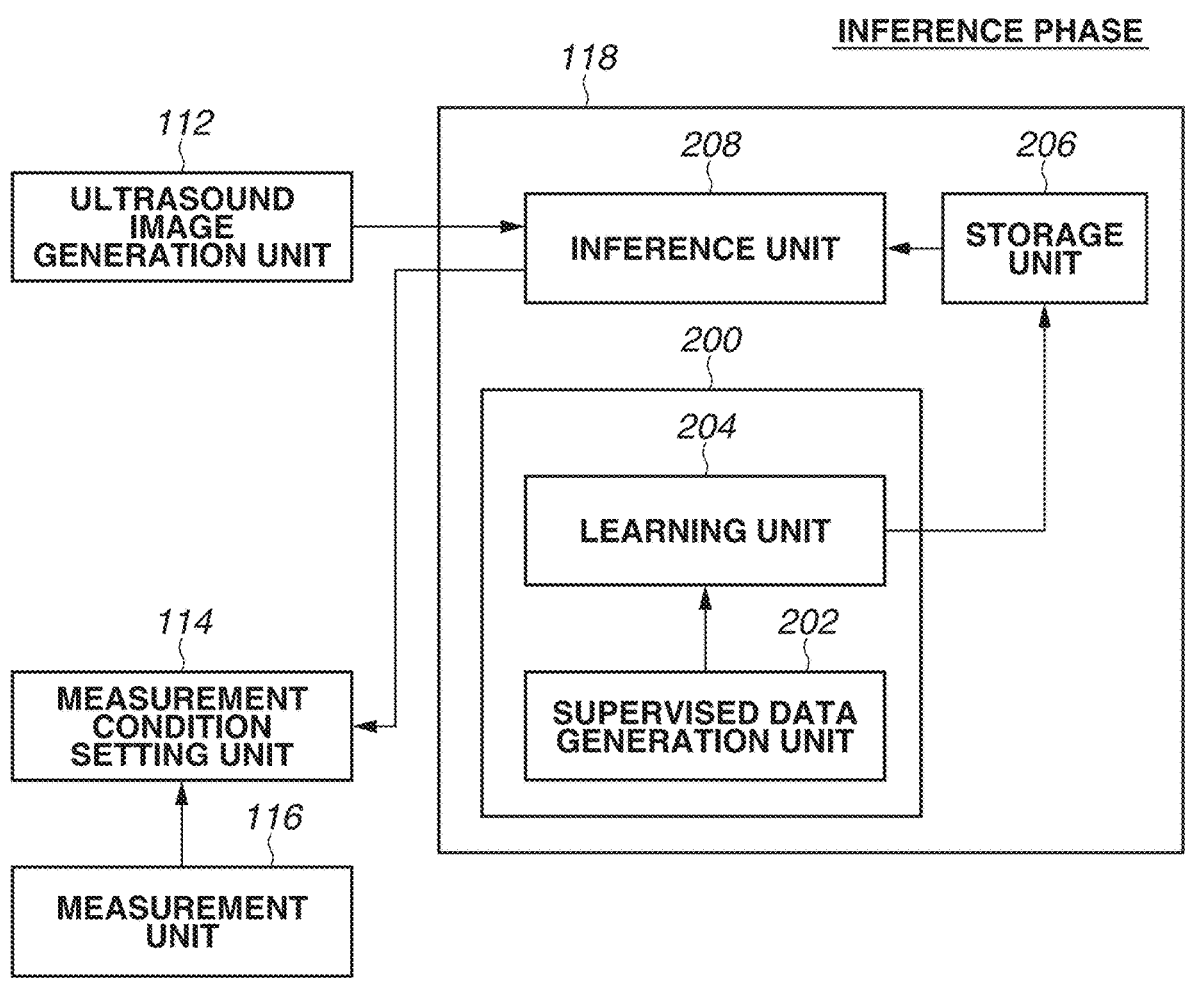
FIG. 4 is a diagram illustrating an inference phase of the ultrasound diagnosis apparatus according to the present invention.

Next, the details of the control unit 118 according to the present invention will be described. The configurations of the control unit 118 in FIGS. 3 and 4 are the same as each other. These different diagrams are used to differentiate the operations in the learning phase and the inference phase. FIG. 3 illustrates an operation of the control unit 118 in the learning phase. FIG. 4 illustrates an operation of the control unit 118 in the inference phase.

The control unit 118 includes a learning device 200, a storage unit 206, and an inference unit 208. The learning device 200 learns as supervised data measurement conditions with which various measurements on ultrasound image data have been made, generating a trained model. The storage unit 206 stores the trained model generated by the learning device 200. The inference unit 208 identifies a measurement part in the ultrasound image data using the trained model, inferring a measurement condition candidate for the measurement part.

The learning device 200 includes a supervised data generation unit 202 and a learning unit 204. The supervised data generation unit 202 generates supervised data for a measurement condition set in ultrasound image data, and the learning unit 204 learns the measurement condition for ultrasound image data using the supervised data generated by the supervised data generation unit 202.

An ultrasound image generated by the ultrasound image generation unit 112 and a measurement condition set by the measurement condition setting unit 114 are input to the learning device 200 (the supervised data generation unit 202). Pieces of ultrasound image data captured in the past and the measurement condition set for each of the pieces of ultrasound image data are stored in memory of the learning device 200. The supervised data generation unit 202 generates supervised data using a set of each of the pieces of ultrasound image data and the corresponding measurement condition (by associating the piece of ultrasound image data and the corresponding measurement condition). The supervised data generation unit 202 stores the set of the piece of ultrasound image data and the corresponding measurement condition (the piece of ultrasound image data and the corresponding measurement condition associated with each other) in memory. The learning device 200 (the learning unit 204) learns the corresponding measurement condition for each of the pieces of ultrasound image data stored in the memory as supervised data.

The learning device 200 (the learning unit 204) can also learn supervised data for classifying measurement parts for ultrasound image data. The learning device 200 (the learning unit 204) performs learning processing based on supervised data including a pair of a correct answer label and a corresponding correct answer image. As a correct answer label, information indicating a measurement part of a subject is set. For example, a correct answer label "carotid artery" is assigned to ultrasound image data (a correct answer image) on a carotid artery. A correct answer label "abdomen" is assigned to ultrasound image data (a correct answer image) on an abdomen. A correct answer label "fetal head" is assigned to ultrasound image data (a correct answer image) on a fetal head.

As described above, the learning device 200 (the learning unit 204) learns a measurement part of a subject for ultrasound image data as supervised data in an associated manner, generating a trained model (a first trained model).

A freeze button of the operation unit 104 is a button for freezing (stopping) ultrasound image data displayed in real time to store ultrasound image data. The operator presses the freeze button with the ultrasound probe 100 stationary to freeze ultrasound image data displayed in real time on the display unit 106. The frozen ultrasound image data can be stored in the ultrasound diagnosis apparatus.

With a measurement condition set for the ultrasound image data frozen on the display unit 106 by the operator pressing the freeze button, the frozen ultrasound image data displayed on the display unit 106 and the measurement condition are output to the learning device 200. The reason why the frozen ultrasound image data is output to the learning device 200 is that the ultrasound image data is suitable to the learning of the learning device 200.

Based on whether no or any measurement range (a cursor) is displayed in the frozen ultrasound image data, the learning device 200 can also determine whether a measurement condition is set for the ultrasound image data.

For example, a measurement range (a cursor) set sandwiching a blood vessel displayed in the ultrasound image data allows the learning device 200 to determine that the measurement condition is set for the ultrasound image data. This allows the learning device 200 to store the ultrasound image data and the measurement condition (the measurement range) in association with each other to learn the measurement condition for the ultrasound image data as supervised data.

For example, the learning unit 204 uses a neural network, which includes plural layers. The layers includes plural intermediate layers between an input layer and an output layer. Although not illustrated, the intermediate layers includes a convolutional layer, a pooling layer, an upsampling layer, and a combining layer. The convolutional layer performs convolution processing on an input value group. The convolutional layer convolves ultrasound image data and a measurement condition (a measurement range) that are input and extracts the features of the ultrasound image data and the measurement condition (the measurement range).

The pooling layer performs the processing of thinning out or combining input value groups, making the number of output value groups smaller than the number of input value groups. The upsampling layer performs the processing of duplicating an input value group or adding a value interpolated from an input value group and making the number of output value groups greater than the number of input value groups. The combining layer performs the processing of inputting value groups, such as output value groups on a certain layer or pixel value groups included in ultrasound image data and a measurement condition (a measurement range), from plural sources and joining or adding these value groups and then combining the value groups. The number of intermediate layers can be changed as appropriate based on the learning content.

As described above, the learning device 200 (the learning unit 204) learns measurement conditions for pieces of ultrasound image data as supervised data in an associated manner using a neural network, generating a trained model (a second trained model). In one or more embodiments, the first and second trained models are generated as different models from each other.

FIGS. 5A and 5B illustrate an example of ultrasound image data output to the learning device 200. FIG. 5A illustrates ultrasound image data with measurement ranges 402 and 404 set in a carotid artery 400 in a lengthwise cross section. The bloodstream image of the carotid artery 400 in the ultrasound image data may be generated using the color Doppler method. The following is a description of making an IMT measurement in the measurement range (region of interest) 402, and making a distance measurement in the measurement range (straight line) 404.

The IMT measurement is a technique for measuring an intima-media complex in the carotid artery 400. As illustrated in FIG. 5B, the IMT measurement processing measures an intima-media complex thickness, which is the thickness of the complex of the intima and the media forming the blood vessel wall of the carotid artery 400. The measurement unit 116 measures the IMT measurement value in the region of interest 402. The measurement unit 116 measures the average value of the distance between the inner boundary of the intima and the boundary between the media and the adventitia in the region of interest 402 as the IMT measurement value.

The distance measurement is a technique for measuring the distance between two points representing the vessel diameter of the carotid artery 400. The measurement unit 116 measures the distance between the blood vessel walls at the top and at the bottom of the carotid artery 400 on the straight line 404.

The learning unit 204 learns the measurement condition for the ultrasound image data (the carotid artery 400) as supervised data: the carotid artery as the measurement part, the vessel diameter as the measurement item, and the straight line as the measurement range. The learning unit 204 also learns the measurement condition for the ultrasound image data (the carotid artery 400) as supervised data: the carotid artery as the measurement part, the IMT measurement as the measurement item, and the region of interest as the measurement range.

In one or more embodiments, the measurement range 402 used as supervised data is information indicating the coordinates of the region in the ultrasound image data (e.g., the coordinates of four points). The measurement range 402 used as supervised data is coordinates input to the operation unit 104 to set the measurement range 402.

In one or more embodiments, the measurement range 404 used as supervised data is information indicating the coordinates of the straight line in the ultrasound image data (e.g., the coordinates of two points). The measurement range 404 used as supervised data is coordinates input to the operation unit 104 to set the measurement range 404.

As described above, the learning unit 204 can learn the features of the measurement conditions actually set for ultrasound image data. The features of the measurement conditions include a measurement part, a measurement item (a type of measurement), and a measurement range.

Figure 6:
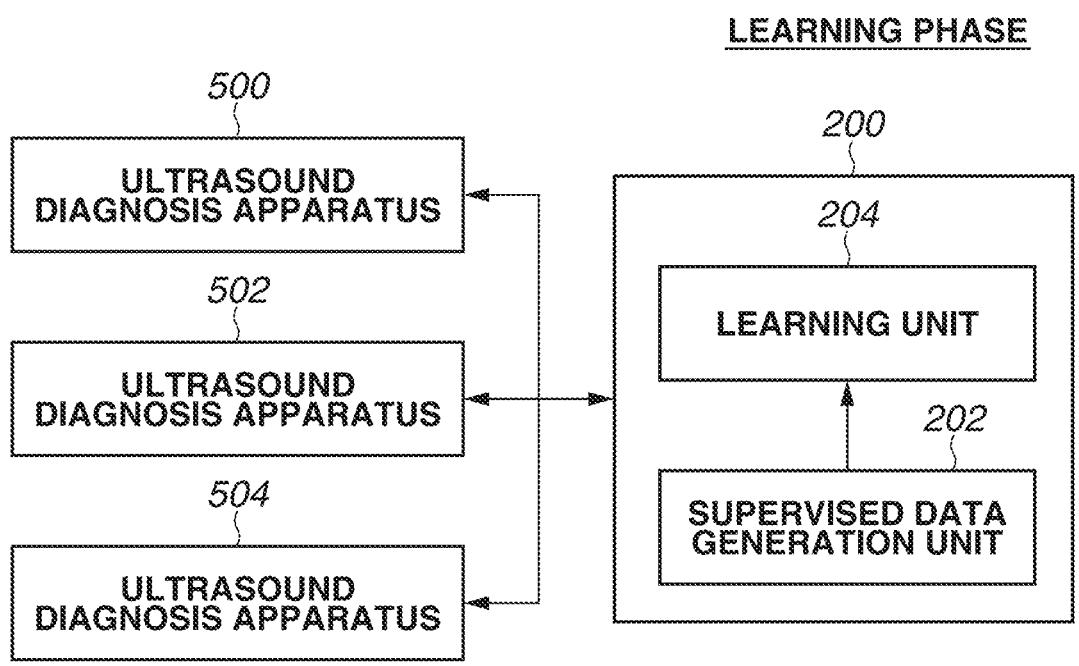
FIG. 6 is a diagram illustrating an example of the learning device according to the present invention disposed outside the ultrasound diagnosis apparatus.

In one or more embodiments, the learning device 200 is placed outside the ultrasound diagnosis apparatus. FIG. 6 illustrates an example of the learning device 200 placed outside the ultrasound diagnosis apparatus.

Examples of the learning device 200 include a network in a hospital or on a cloud outside the hospital. The learning device 200 is connected to plural ultrasound diagnosis apparatuses 500, 502, and 504. The number of plural ultrasound diagnosis apparatuses here is three, but four ultrasound diagnosis apparatuses or more may be connected to the learning device 200.

For example, the learning device 200 learns measurement conditions for ultrasound image data captured by the ultrasound diagnosis apparatus 500 as supervised data, generating a trained model. The learning device 200 also learns measurement conditions for ultrasound image data captured by the ultrasound diagnosis apparatus 502, different from the ultrasound diagnosis apparatus 500, as supervised data, updating the trained model. Similarly, the learning device 200 learns measurement conditions for ultrasound image data captured by the ultrasound diagnosis apparatus 504, different from the ultrasound diagnosis apparatuses 500 and 502, as supervised data, updating the trained model. The trained model generated (updated) by the learning device 200 is transmitted to each of the ultrasound diagnosis apparatuses 500, 502, and 504. Each of the ultrasound diagnosis apparatuses 500, 502, and 504 stores the latest trained model generated by the learning device 200.

As described above, the learning device 200 can learn measurement conditions set in the ultrasound diagnosis apparatuses 500, 502, and 504 as supervised data. Thus, the learning device 200 can generate a trained model suitable for the ultrasound diagnosis apparatuses 500, 502, and 504.

With reference to FIG. 4, the measurement unit 116 in the inference phase will be described. The storage unit 206 is connected to the learning device 200. The storage unit 206 stores a trained model trained to set a measurement condition for ultrasound image data. Specifically, the storage unit 206 stores a trained model trained to identify a particular region (a blood vessel of a carotid artery) in ultrasound image data and set a measurement condition for the particular region.

Ultrasound image data newly generated by the ultrasound image generation unit 112 is output to the inference unit 208. Using the trained model trained to set a measurement condition for ultrasound image data, the inference unit 208 infers measurement condition candidates for the newly generated ultrasound image data.

Using a trained model (the first trained model) trained to set a measurement part for ultrasound image data, the inference unit 208 infers a measurement part for the newly generated ultrasound image data. Specifically, the storage unit 206 stores a trained model based on supervised data (ultrasound image data) classified into plural measurement parts (the abdomen, the chest, the heart, a carotid artery, and a fetus). Thus, for new ultrasound image data input to the inference unit 208, the inference unit 208 classifies a measurement part for the new ultrasound image data based on the features of the new ultrasound image data and the supervised data.

Further, the storage unit 206 stores a trained model (the second trained model) based on supervised data about measurement items and measurement ranges corresponding to the measurement parts (the abdomen, the chest, the heart, a carotid artery, and a fetus). Thus, for new ultrasound image data input to the inference unit 208, the inference unit 208 infers measurement condition candidates for the measurement item and the measurement range corresponding to a measurement part for the new ultrasound image data.

As described above, using the trained models (the first trained model and the second trained model), the inference unit 208 identifies a measurement part for newly generated ultrasound image data and also infers a measurement range corresponding to the measurement part.

Figure 7:
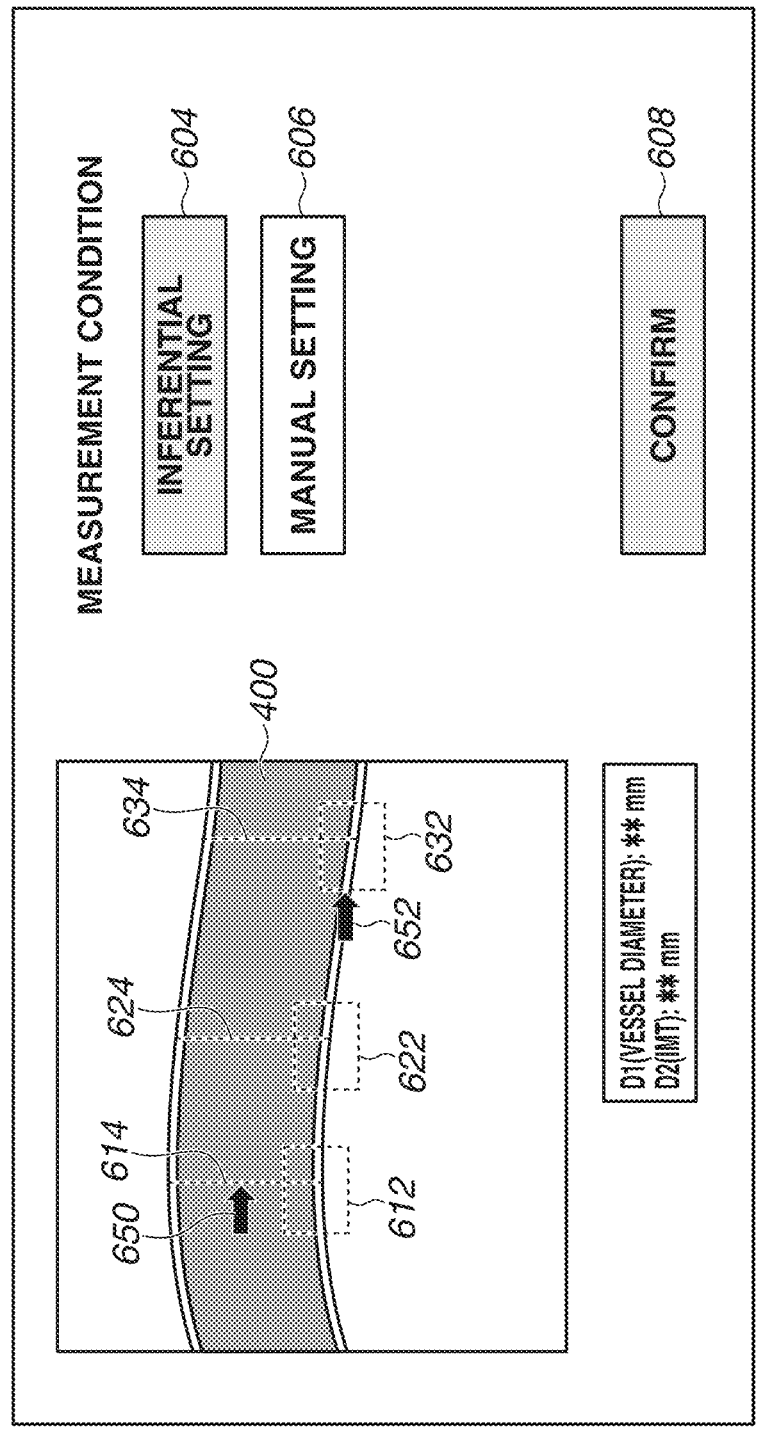
FIG. 7 is a diagram illustrating selection of measurement condition candidates according to the present invention.

Next, with reference to FIG. 7, the display format of the display unit 106 of the ultrasound diagnosis apparatus will be described. FIG. 7 illustrates an inferential setting button 604 for inferentially setting a measurement condition, a manual setting button 606 for manually setting a measurement condition, and a confirmation button 608 displayed. The inferential setting button 604, the manual setting button 606, and the confirmation button 608 respond to the operation unit 104. The inferential setting button 604, the manual setting button 606, and the confirmation button 608 are displayed as icons on the display unit 106, and the operator can select the inferential setting button 604 or the manual setting button 606. As an initial setting, the inferential setting button 604 may be pressed.

In response to a press of the inferential setting button 604 by the operator, the inference unit 208 infers measurement condition candidates for ultrasound image data (the carotid artery 400) displayed on the display unit 106 using a trained model trained to set a measurement condition for ultrasound image data. The measurement condition candidates inferred by the inference unit 208 are output to the display unit 106 and the measurement condition setting unit 114.

The display unit 106 displays measurement condition (the measurement range: a straight line) candidates 614, 624, and 634 for measuring the vessel diameter on the ultrasound image data (the carotid artery 400). It is assumed here that the inferred three measurement condition candidates 614, 624, and 634 for measuring the vessel diameter are displayed. The operator uses an indication mark 650 to select a measurement condition candidate suitable for measuring the vessel diameter. Then, the operator presses the confirmation button 608, confirming this selection. That is, the ultrasound diagnosis apparatus according to the present invention includes a selection unit that selects a single measurement condition candidate from among plural measurement condition candidates inferred by the inference unit 208.

FIG. 7 illustrates a selection of the measurement condition candidate 614 from among the measurement condition candidates 614, 624, and 634 using the indication mark 650. The operator can select the measurement condition candidate 614 suitable to measure the vessel diameter from among the measurement condition candidates 614, 624, and 634. The measurement condition setting unit 114 can set a measurement condition (the measurement range: the straight line) based on the selected measurement condition candidate 614.

If a single measurement condition candidate is inferred by the inference unit 208, the measurement condition setting unit 114 sets a measurement condition (the measurement range: a straight line) corresponding to the measurement condition candidate. If the inferred measurement condition candidates are not suitable, the operator presses the manual setting button 606, manually setting a measurement condition for the measurement condition setting unit 114. As described above, the format in which the measurement condition setting unit 114 sets a measurement condition differs with the number of measurement condition candidates inferred by the inference unit 208.

The measurement unit 116 makes the distance measurement using the measurement condition (the measurement range: the straight line 614) set by the measurement condition setting unit 114. The measurement unit 116 measures the distance between the blood vessel walls at the top and the bottom of the carotid artery 400 with the measurement condition set by the measurement condition setting unit 114. The display unit 106 displays the measurement result of the distance measurement based on the measurement condition (the measurement range: the straight line 614) set by the measurement condition setting unit 114.

The display unit 106 also displays measurement condition (the measurement range: a region of interest) candidates 612, 622, and 632 for making the IMT measurement on the ultrasound image data (the carotid artery 400). It is assumed here that the inferred three measurement condition candidates 612, 622, and 632 for making the IMT measurement are displayed. The operator uses an indication mark 652 to select a measurement condition candidate suitable for the IMT measurement. Then, the operator presses the confirmation button 608, confirming this selection.

FIG. 7 illustrates a selection of the measurement condition candidate 632 from among the measurement condition candidates 612, 622, and 632 using the indication mark 652. The operator can select the measurement condition candidate 632 suitable for the IMT measurement from among the measurement condition candidates 612, 622, and 632. The measurement condition setting unit 114 can set a measurement condition (the measurement range: the region of interest 632) based on the selected measurement condition candidate 632.

If a single measurement condition candidate is inferred by the inference unit 208, the measurement condition setting unit 114 sets a measurement condition (the measurement range: a region of interest) corresponding to the single measurement condition candidate. If the measurement condition candidates inferred by the inference unit 208 are not suitable, the operator presses the manual setting button 606, manually setting a measurement condition (the measurement range: a region of interest) for the measurement condition setting unit 114.

The measurement unit 116 makes the IMT measurement using the measurement condition (the measurement range: the region of interest 632) set by the measurement condition setting unit 114. The measurement unit 116 makes the IMT measurement of the carotid artery 400 with the measurement condition set by the measurement condition setting unit 114. The display unit 106 displays the measurement result of the IMT measurement based on the measurement condition (the measurement range: the region of interest 632) set by the measurement condition setting unit 114.

With reference to FIG. 8, the operation in the learning phase in the ultrasound diagnosis apparatus will be described.

In step S700, the operator brings the ultrasound probe 100 into contact with the subject. The ultrasound probe 100 may be in contact with the subject through ultrasound gel. With the ultrasound probe 100 in contact with the subject, the transmission/reception unit 110 causes the ultrasound probe 100 to transmit and receive an ultrasound wave.

In step S702, the ultrasound image generation unit 112 performs various types of signal processing on an ultrasound signal generated from the reflected wave signal by the transmission/reception unit 110, generating ultrasound image data.

In step S704, the operator determines whether a measurement condition is to be set for the ultrasound image data, via the operation unit 104 (the measurement condition setting unit 114). In one or more embodiments, it is determined whether a measurement condition is to be set for the ultrasound image data, based on the measurement part. For example, if the measurement part is a predetermined measurement part such as a carotid artery or a fetus, it can also be considered that a measurement condition is to be set for the ultrasound image data through the operation unit 104 (the measurement condition setting unit 114). If a measurement condition is to be set for the ultrasound image data (YES in step S704), the processing proceeds to step S706. Otherwise (NO in step S704), the operation regarding the learning phase ends.

In step S706, the measurement condition setting unit 114 sets a measurement condition for the ultrasound image data generated by the ultrasound image generation unit 112. The measurement condition set by the measurement condition setting unit 114 is transmitted to the learning device 200.

In step S708, the learning device 200 learns the measurement condition set for the ultrasound image data as supervised data to generate a trained model. In one or more embodiments, the learning device 200 learns the ultrasound image data and the measurement condition as supervised data to generate a trained model. After step S708, the operation in the learning phase ends.

Next, with reference to FIG. 9, the operation in the inference phase in the ultrasound diagnosis apparatus will be described.

In step S800, the operator brings the ultrasound probe 100 into contact with the subject. With the ultrasound probe 100 in contact with the subject, the transmission/reception unit 110 causes the ultrasound probe 100 to transmit and receive an ultrasound wave.

In step S802, the ultrasound image generation unit 112 performs various types of signal processing on an ultrasound signal generated from the reflected wave signal by the transmission/reception unit 110, generating ultrasound image data.

In step S804, the operator determines whether a measurement condition is to be set for the ultrasound image data, via the operation unit 104 (the measurement condition setting unit 114). In one or more embodiments, it is determined whether a measurement condition is to be set for the ultrasound image data, based on the image capturing part. If the measurement part is a predetermined measurement part such as a carotid artery or a fetus, it can also be considered that a measurement condition is to be set for the ultrasound image data. If a measurement condition is to be set for the ultrasound image data (YES in step S804), the processing proceeds to step S808. Otherwise (NO in step S804), the processing proceeds to step S806.

In step S806, the display unit 106 displays the ultrasound image data generated by the ultrasound image generation unit 112. After step S806, the operation in the inference phase ends.

In step S808, the operator determines whether a measurement condition is to be inferentially set, via the operation unit 104. For example, as illustrated in FIG. 7, the operator selects the inferential setting button 604 or the manual setting button 606. If a measurement condition is to be inferentially set (YES in step S808), the processing proceeds to step S812. Otherwise (NO in step S808), the processing proceeds to step S810.

In step S810, if the operator presses the manual setting button 606, the operator manually sets a measurement condition via the operation unit 104 (the measurement unit 116) while checking the ultrasound image data (the carotid artery 400).

In step S812, using a trained model trained to set a measurement condition for ultrasound image data, the inference unit 208 infers measurement condition candidates for the ultrasound image data displayed on the display unit 106. The inferred measurement condition candidates are transmitted to the measurement condition setting unit 114.

In step S814, the measurement condition setting unit 114 sets a measurement condition of the measurement condition candidates. The display unit 106 displays the measurement result obtained by making measurements on the ultrasound image data generated by the ultrasound image generation unit 112 with the measurement condition generated by the measurement condition setting unit 114. After step S814, the operation in the inference phase ends.

As described above, in response to the display of ultrasound image data with the ultrasound probe 100 brought by the operator in contact with the subject, a measurement condition is automatically set. This enables measurements based on the measurement condition to be automatically made simultaneously with the display of the ultrasound image data. The operator acquires the measurement result using the ultrasound image data through a simple operation of bringing the ultrasound probe 100 into contact with the subject and pressing the freeze button.

As described above, the ultrasound diagnosis apparatus according to the present exemplary embodiment includes a generation unit (the ultrasound image generation unit 112), which generates ultrasound image data on a subject, the inference unit 208, which infers measurement condition candidates for the ultrasound image data on the subject using a trained model trained with measurement conditions set for ultrasound image data on others but the subject as supervised data, and the measurement condition setting unit 114, which sets a measurement condition for the ultrasound image data on the subject, of the measurement condition candidates set by the inference unit 208. The ultrasound diagnosis apparatus also includes the measurement unit 116, which makes measurements on the ultrasound image data on the subject based on the measurement condition set by the measurement condition setting unit 114.

According to the present invention, a trained model trained with measurement conditions set for ultrasound image data (first ultrasound image data) as supervised data allows a measurement condition for newly generated ultrasound image data (second ultrasound image data) to be quickly set.

With reference to FIGS. 2 to 4 and 10A to 10C, an ultrasound diagnosis apparatus according to a second exemplary embodiment of the present invention will be described.

The second exemplary embodiment is different from the first exemplary embodiment in that measurement conditions are set for ultrasound image data obtained by capturing a fetus.

As illustrated in FIG. 2, the measurement part setting unit 120 sets a measurement part for ultrasound image data generated by the ultrasound image generation unit 112. The measurement part in the present exemplary embodiment is a fetus.

If the measurement part is a fetus, the measurement item setting unit 122 sets the biparietal diameter (the diameter around the left and right parietal bones), the abdominal circumference (the length around the abdomen of the fetus), and the femur length (the length of the thigh bone) as measurement items.

The measurement range setting unit 124 sets measurement ranges (cursors) corresponding to the measurement items set by the measurement item setting unit 122 for the ultrasound image data. Each of the measurement ranges (the cursors) is a measurement caliper for measuring dimensions of tissue visualized in the ultrasound image data. A measurement caliper is used to specify a measurement range to measure a measurement target. For example, a measurement caliper is placed sandwiching the head between the left and right, allowing the biparietal diameter to be measured. A measurement caliper is placed surrounding the periphery of the abdomen, allowing the abdominal circumference to be measured.

The measurement unit 116 makes various measurements on the ultrasound image data with measurement conditions set by the measurement condition setting unit 114 (the measurement part setting unit 120, the measurement item setting unit 122, and the measurement range setting unit 124).

As illustrated in FIG. 3, the learning unit 204 learns plural measurement conditions for ultrasound image data (a fetus) as supervised data. The learning unit 204 here learns, as supervised data, plural measurement conditions: the fetal head as a measurement part, the biparietal diameter as an measurement item, and a straight line as a measurement range; the fetal abdomen as a measurement part, the abdominal circumference as a measurement item, and the circumference as a measurement range; and the fetal femur as a measurement part, the femur length as a measurement item, and a straight line as a measurement range.

For example, with some measurement ranges (cursors) set for the fetus displayed in the ultrasound image data, the learning device 200 can determine that the measurement conditions are set for the ultrasound image data. Then, the learning device 200 can store the ultrasound image data and the measurement conditions (the measurement ranges) in association with each other, and learns the measurement conditions for the ultrasound image data as supervised data.

As described above, the learning unit 204 can learn the features of measurement conditions actually set for ultrasound image data. The features of measurement conditions include a measurement part, a measurement item (the type of measurement), and a measurement range.

As illustrated in FIG. 4, ultrasound image data newly generated by the ultrasound image generation unit 112 is output to the inference unit 208. Using a trained model trained to set measurement conditions for ultrasound image data, the inference unit 208 infers measurement condition candidates for the newly generated ultrasound image data.

Specifically, the storage unit 206 stores a trained model (the first trained model) based on supervised data (ultrasound image data) classified into plural measurement parts (the fetal head, the fetal abdomen, and the fetal femur). Thus, if new ultrasound image data is input to the inference unit 208, the inference unit 208 can classify a measurement part for the new ultrasound image data based on the features of the new ultrasound image data and the supervised data.

Further, the storage unit 206 stores a trained model (the second trained model) based on supervised data about measurement items and measurement ranges corresponding to the measurement parts (the fetal head, the fetal abdomen, and the fetal femur). Thus, if new ultrasound image data is input to the inference unit 208, the inference unit 208 can infer measurement condition candidates for a measurement item and a measurement range corresponding to a measurement part for the new ultrasound image data.

As illustrated in FIGS. 10A to 10C, the measurement unit 116 makes measurements with measurement conditions set by the measurement condition setting unit 114. FIG. 10A illustrates an example: the fetal head as a measurement part, the biparietal diameter as a measurement item, and a straight line as a measurement range. The measurement unit 116 measures the left-right distance of the fetal head with the measurement condition set by the measurement condition setting unit 114. The display unit 106 displays as the biparietal diameter the measurement result of the distance measurement based on the measurement condition (a straight line 900 as a measurement range) set by the measurement condition setting unit 114. FIG. 10B illustrates an example: the fetal abdomen as a measurement part, the abdominal circumference as a measurement item, and the circumference as a measurement range. The measurement unit 116 measures the circumference of the fetal abdomen with the measurement condition set by the measurement condition setting unit 114. The display unit 106 displays as the abdominal circumference the measurement result of the circumference based on the measurement condition (a curve 902 as a measurement range) set by the measurement condition setting unit 114. FIG. 10C illustrates an example: the fetal femur as a measurement part, the femur length as a measurement item, and a straight line as a measurement range. The measurement unit 116 measures the distance of the fetal femur with the measurement condition set by the measurement condition setting unit 114. The display unit 106 displays as the femur length the measurement result of the distance measurement based on the measurement condition (a straight line 904 as a measurement range) set by the measurement condition setting unit 114.

Thus, according to the present invention, a trained model trained with measurement conditions set for ultrasound image data (the fetal head, the fetal abdomen, and the fetal femur) as supervised data allows measurement conditions for newly generated ultrasound image data (the fetal head, the fetal abdomen, and the fetal femur) to be quickly set.

A computer program for achieving the functions of the first and second exemplary embodiments can be supplied to a computer via a network or a storage medium (not illustrated) and executed. The computer program is a computer program for causing a computer to execute the above ultrasound image data display method. That is, the computer program is a program for achieving the functions of the ultrasound diagnosis apparatus using a computer. The storage medium stores the computer program.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-153486, filed Sep. 14, 2020, which is hereby incorporated by reference herein in its entirety.

What is claimed is:

1. An ultrasound diagnosis apparatus comprising:
an ultrasound probe that transmits and receives ultrasound waves and converts received ultrasound waves into ultrasound signals;
a display;
at least one memory that stores a set of instructions; and
at least one processor that executes the instructions to perform:
generating ultrasound image data on a subject from the ultrasound signals received from the ultrasound probe;
inferring at least one measurement range candidate for the ultrasound image data on the subject using a first trained model and a second trained model, wherein the first trained model has been trained with ultrasound image data classified into plural measurement parts as supervised data and the second trained model has been trained with measurement ranges corresponding to the measurement parts as supervised data, wherein the first trained model outputs a measurement part based on the ultrasound image data, and the second trained model outputs the at least one measurement range candidate based on the measurement part outputted from the first trained model;
determining a result of the inference as having a single measurement range candidate or a plurality of measurement range candidates;
controlling the display to overlay the determined result of inference over the generated ultrasound image data such that the determined result including a plurality of measurement range candidates displayable over the generated ultrasound image such that one of the plurality of measurement range candidates is selectable by a user as a particular measurement;
setting a target measurement range used to perform measurement of a region in the generated ultrasound image, wherein the single measurement range candidate is set as the target measurement range when the determined result of the inference is the single measurement range candidate, and the selected particular measurement range candidate overlaid on the generated ultrasound image is set as the target measurement range when the determined result of the inference is the plurality of measurement range candidates;
making a measurement of a region of the ultrasound image data of the subject based on the set target measurement range; and
displaying, on the display, the measurement result about the target measurement range.

2. The ultrasound diagnosis apparatus according to claim 1, further comprising a learning device configured to learn measurement range candidates for ultrasound image data as supervised data to generate the trained model.

3. The ultrasound diagnosis apparatus according to claim 2, wherein, when the target measurement range candidate set for the ultrasound image data is frozen on the display unit, the displayed ultrasound image data and the set target measurement candidate are output to the learning device.

4. The ultrasound diagnosis apparatus according to claim 2, wherein the learning device determines whether a target measurement range candidate is set for the ultrasound image data frozen on the display unit based the target measurement range candidate is displayed in the ultrasound image data frozen on the display unit.

5. The ultrasound diagnosis apparatus according to claim 2, wherein the learning device learns the measurement range candidate for the ultrasound image data as supervised data in an associated manner using a neural network to generate the trained model.

6. The ultrasound diagnosis apparatus according to claim 2, further comprising a storage unit configured to store the trained model generated by the learning device.

7. The ultrasound diagnosis apparatus according to claim 2, wherein the learning device is outside the ultrasound diagnosis apparatus.

8. The ultrasound diagnosis apparatus according to claim 7, wherein the learning device learns measurement ranges candidates set by a plurality of ultrasound diagnosis apparatuses as supervised data.

9. The ultrasound diagnosis apparatus according to claim 1, wherein the measurement range candidate represents a measurement part of the subject.

10. The ultrasound diagnosis apparatus according to claim 9, wherein the measurement range candidate is a range composed of a straight line or a curve.

11. A measurement condition setting method comprising:
receiving ultrasound signals generated by an ultrasound probe;
generating ultrasound image data on a subject from the received ultrasound signals;
inferring at least one measurement range candidate for the ultrasound image data on the subject using a first trained model and a second trained model, wherein the first trained model has been trained with ultrasound image data classified into plural measurement parts as supervised data and the second trained model has been trained with measurement ranges corresponding to the measurement parts as supervised data, wherein the first trained model outputs a measurement part based on the ultrasound image data, and the second trained model outputs at least one measurement range candidate based on the measurement part output from the first trained model;
determining a result of the inference as having a single measurement range candidate or a plurality of measurement range candidates;
displaying, on a display, the determined result of inference as an overlay over the generated ultrasound image such that the determined result including a plurality of measurement range candidates displayable over the generated ultrasound image such that one of the plurality of measurement range candidates is selectable by a user as a particular measurement;
setting a target measurement range used to perform measurement of a region in the generated ultrasound image, wherein the single measurement range candidate is set as the target measurement range when the determined result of the inference is the single measurement range candidate, and the selected particular measurement range candidate overlaid on the generated ultrasound image is set as the target measurement range when the determined result of the inference is the plurality of measurement range candidates;
making a measurement of a region of the ultrasound image data of the subject based on the set target measurement range; and
displaying, on the display, the measurement result about the target measurement range.

12. A non-transitory computer-readable storage medium storing a program for causing a computer to execute a measurement condition setting method comprising:
receiving ultrasound signals generated by an ultrasound probe;
generating ultrasound image data on a subject from the received ultrasound signals;
inferring at least one measurement range candidate for the ultrasound image data on the subject using a first trained model and a second trained model, wherein the first trained model has been trained with ultrasound image data classified into plural measurement parts as supervised data and the second trained model has been trained with measurement ranges corresponding to the measurement parts as supervised data, wherein the first trained model outputs a measurement part based on the ultrasound image data, and the second trained model outputs at least one measurement range candidate based on the measurement part output from the first trained model;
determining a result of the inference as having a single measurement range candidate or a plurality of measurement range candidates;
displaying, on a display, the determined result of inference as an overlay over the generated ultrasound image such that the determined result including a plurality of measurement range candidates displayable over the generated ultrasound image such that one of the plurality of measurement range candidates is selectable by a user as a particular measurement;
setting a target measurement range used to perform measurement of a region in the generated ultrasound image, wherein the single measurement range candidate is set as the target measurement range when the determined result of the inference is the single measurement range candidate, and the selected particular measurement range candidate overlaid on the generated ultrasound image is set as the target measurement range when the determined result of the inference is the plurality of measurement range candidates;
making a measurement of a region of the ultrasound image data of the subject based on the set target measurement range; and
displaying, on the display, the measurement result about the target measurement range.

* * * * *